(12) United States Patent
Hara et al.

(10) Patent No.: US 9,927,309 B2
(45) Date of Patent: Mar. 27, 2018

(54) SEMICONDUCTOR DEVICE AND TEST METHOD

(71) Applicant: Toshiba Memory Corporation, Minato-ku (JP)

(72) Inventors: Makoto Hara, Yokohama (JP); Shuuji Matsumoto, Sagamihara (JP); Hirosi Ootuka, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 673 days.

(21) Appl. No.: 14/479,522

(22) Filed: Sep. 8, 2014

(65) Prior Publication Data
US 2015/0338290 A1 Nov. 26, 2015

Related U.S. Application Data

(60) Provisional application No. 62/001,092, filed on May 21, 2014.

(51) Int. Cl.
| | |
|---|---|
| G01K 15/00 | (2006.01) |
| G01K 19/00 | (2006.01) |
| G01K 13/00 | (2006.01) |
| G01K 3/00 | (2006.01) |
| G01K 7/01 | (2006.01) |

(52) U.S. Cl.
CPC .......... G01K 15/007 (2013.01); G01K 3/005 (2013.01); G01K 7/01 (2013.01); G01K 13/00 (2013.01)

(58) Field of Classification Search
None
See application file for complete search history.

(56) References Cited

U.S. PATENT DOCUMENTS

| | | | |
|---|---|---|---|
| 2003/0149914 A1* | 8/2003 | Kim | G06K 19/073 714/30 |
| 2007/0041425 A1* | 2/2007 | Lee | G01K 15/00 374/208 |
| 2009/0080281 A1* | 3/2009 | Hashiba | G11O 5/143 365/230.06 |
| 2015/0255177 A1 | 9/2015 | Matsumoto | |

FOREIGN PATENT DOCUMENTS

| | | |
|---|---|---|
| JP | 3-197194 | 8/1991 |
| JP | 2004-139147 | 5/2004 |
| JP | 2008-269379 | 11/2008 |
| JP | 5187765 | 4/2013 |

* cited by examiner

Primary Examiner — Erica Lin
(74) Attorney, Agent, or Firm — Oblon, McClelland, Maier & Neustadt, L.L.P.

(57) ABSTRACT

According to one embodiment, there is provided a semiconductor device including a temperature detection circuit and a test circuit. The temperature detection circuit is configured to detect a temperature by comparing potential of a reference block and reference potential. The test circuit is configured to test, in a test mode, an operation of the temperature detection circuit by serially switching a value of the reference potential to a value selected from a plurality of values, which is different from each other, while a temperature of the semiconductor device is kept at a first temperature.

18 Claims, 10 Drawing Sheets

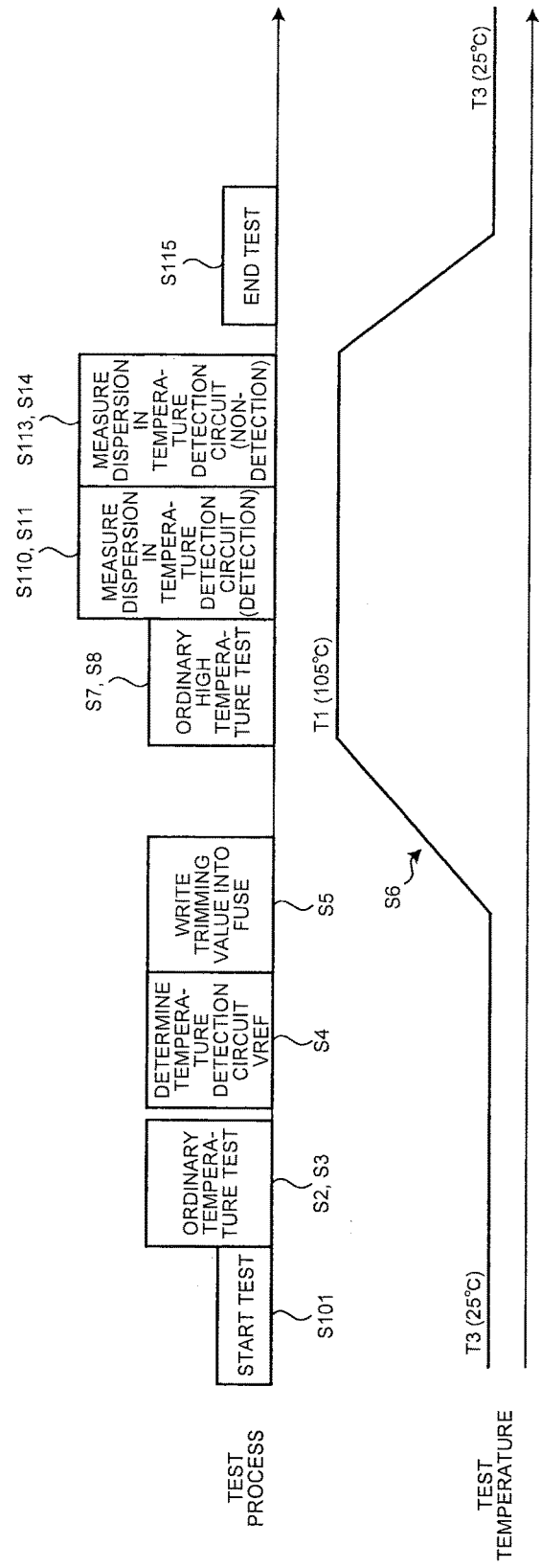

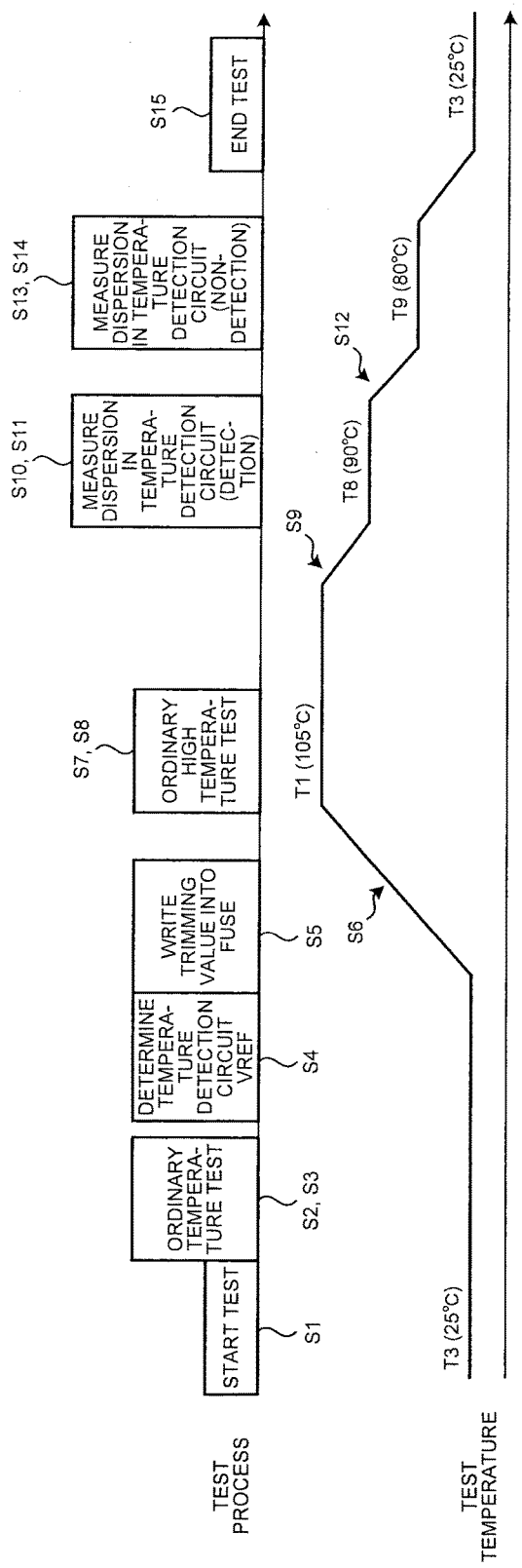

SEMICONDUCTOR DEVICE AND TEST METHOD

CROSS-REFERENCE TO RELATED APPLICATIONS

This application is based upon and claims the benefit of priority from Provisional Application No. 62/001,092, filed on May 21, 2014; the entire contents of which are incorporated herein by reference.

FIELD

Embodiments described herein relate generally to a semiconductor device and a test method.

BACKGROUND

A semiconductor device, to which a nonvolatile semiconductor memory is mounted such as a memory card may generate heat along with an operation and a temperature thereof may be increased. Thus, to make the semiconductor device operate in a permissible temperature range, it is desired to detect a temperature of the semiconductor device appropriately.

BRIEF DESCRIPTION OF THE DRAWINGS

FIG. 4 is a chart illustrating the test method of the semiconductor device according to the embodiment;

FIG. 10 is a chart illustrating the test method of the semiconductor device according to the basic form.

DETAILED DESCRIPTION

In general, according to one embodiment, there is provided a semiconductor device including a temperature detection circuit and a test circuit. The temperature detection circuit is configured to detect a temperature by comparing potential of a reference block and reference potential. The test circuit is configured to test, in a test mode, an operation of the temperature detection circuit by serially switching a value of the reference potential to a value selected from a plurality of values, which is different from each other, while a temperature of the semiconductor device is kept at a first temperature.

Exemplary embodiments of a semiconductor device will be explained below in detail with reference to the accompanying drawings. The present invention is not limited to the following embodiments.

Embodiment

Figure 6:
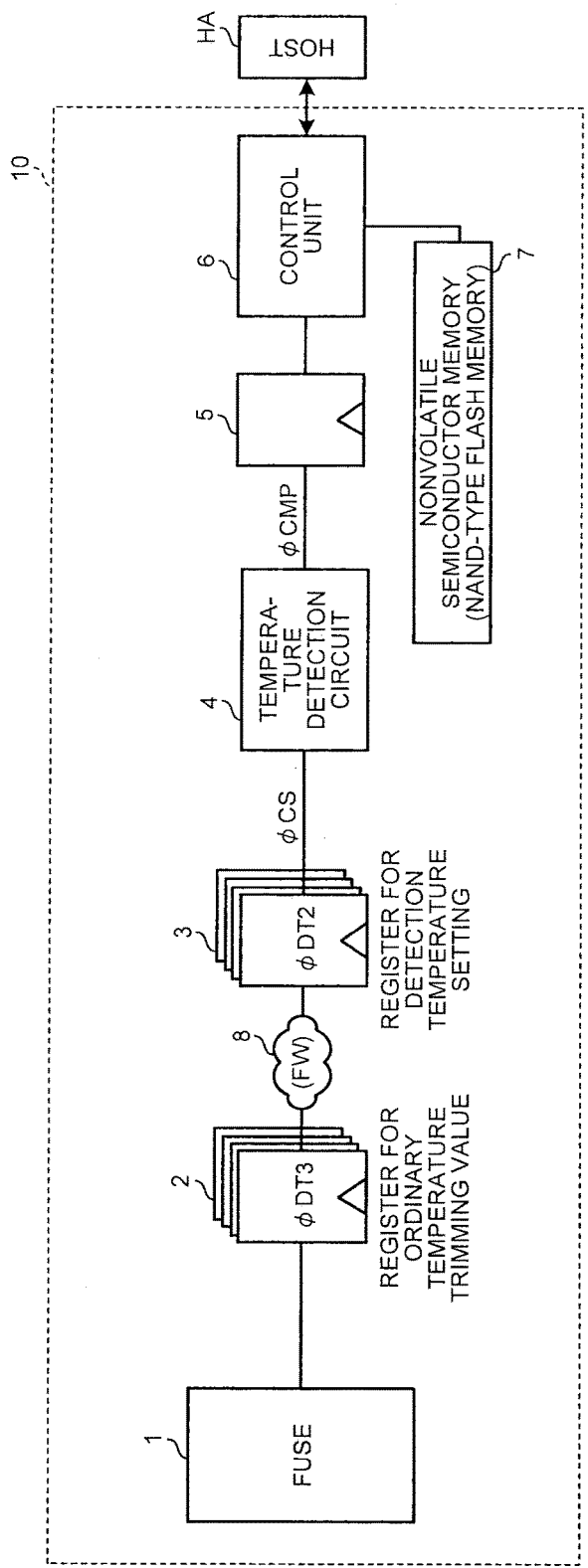
FIG. 6 is a view illustrating a configuration of a semiconductor device according to a basic form.

Before a semiconductor device 100 according to the embodiment is described, a semiconductor device 10 according to a basic form will be described with reference to FIG. 6. FIG. 6 is a view illustrating a configuration of the semiconductor device 10.

The semiconductor device 10 includes a nonvolatile semiconductor memory 7 and functions as an external storage medium for a host HA. For example, the semiconductor device 10 may be a memory card detachable from the host HA or an embedded device which is installed in a chassis of the host HA. In the following description, a case where the semiconductor device 10 is a memory card will be exemplified, but the description can also be applied to a case where the semiconductor device 10 is an embedded device.

Speed-up and downsizing of the semiconductor device 10, to which a nonvolatile semiconductor memory 7 is mounted, such as a memory card have been performed, whereby calorific value is increased due to the speed-up and a heat dissipation characteristic is deteriorated due to the downsizing. Thus, along with an operation, the semiconductor device 10 may generate heat and a temperature thereof may be increased. Therefore, to make the semiconductor device 10 operate in a permissible temperature range, it is desired to detect a temperature of the semiconductor device 10 appropriately.

In the basic form, to detect the temperature of the semiconductor device 10, a temperature detection circuit 4 is mounted to the semiconductor device 10. For example, the temperature detection circuit 4 is arranged near the nonvolatile semiconductor memory 7 and detects an increase in the temperature of the semiconductor device 10 caused along with the heat generation in the nonvolatile semiconductor memory 7.

While a function of the semiconductor device 10 (memory card) has become higher, a price thereof has become lower. Thus, since it is necessary to develop a temperature detection function at low cost, a configuration of the temperature detection circuit 4 becomes simple. The temperature detection function is a function to determine whether a temperature is higher/lower than a set temperature.

Specifically, as illustrated in FIG. 6, the semiconductor device 10 includes a fuse (FUSE) 1, a register 2, a register (first register) 3, a temperature detection circuit 4, a register 5, and a control unit 6. The temperature detection circuit 4 detects a temperature of the semiconductor device 10 by using reference potential VREF.

In the basic form, an origin of an operation characteristic of the temperature detection circuit 4 is matched to an actual operation condition. Thus, the control unit 6 makes the temperature detection circuit 4 detect a temperature while serially switching a value of the reference potential VREF in an ordinary temperature (25° C.) state to a value selected from two or more values which are different from each other. According to a detection result of the temperature detection circuit 4 at the ordinary temperature (25° C.), the control unit 6 determines a value of the reference potential VREF corresponding to the ordinary temperature (DT3=25° C.) and a control value φDT3 for controlling the reference potential VREF to be the value and writes the control value φDT3 into the fuse 1. The fuse 1 includes a nonvolatile storage circuit and stores the written control value φDT3 in a nonvolatile manner.

A function module 8 functionally realized in a microprocessor (not illustrated) by a firmware FW reads the control value φDT3 from the fuse 1 and stores the read control value φDT3 as an ordinary temperature trimming value into the register 2 (register for ordinary temperature trimming value). Also, according to the control value φDT3 stored in the register 2, the function module 8 calculates a control value φDT2 to be used by the temperature detection circuit 4 in a normal mode and stores the calculated control value φDT2 into the register 3 (register for detection temperature setting). The normal mode is a mode used in an operation of the semiconductor device 10 after the semiconductor device 10 is shipped.

That is, in order to make the semiconductor device 10 operate within a permissible temperature range (such as 90° C. or lower) in the normal mode, a value of the reference potential VREF corresponding to a detection temperature DT2 (such as 85° C.) to be detected by the temperature detection circuit 4 and a control value φDT2 for controlling the reference potential VREF to be the value are determined and the control value φDT2 is stored into the register 3.

The control value φCS may be a digital value or an analog value. Thus, in the normal mode, when the temperature detection circuit 4 detects the detection temperature DT2 and an output φCMP thereof changes from an L level to an H level, the value is held in the register 5. When recognizing that the output φCMP, which is held in the register 5, of the temperature detection circuit 4 has become the H level, the control unit 6 determines that the temperature of the semiconductor device 10 has become the detection temperature DT2 (such as 85° C.). After the determination, when necessary, the control unit 6 may perform control, for example, to switch control in a bus into an optimal operation at 85° C. or higher or may switch an operation mode to a low power mode to control the heat generation of the semiconductor device 10.

Figure 7:
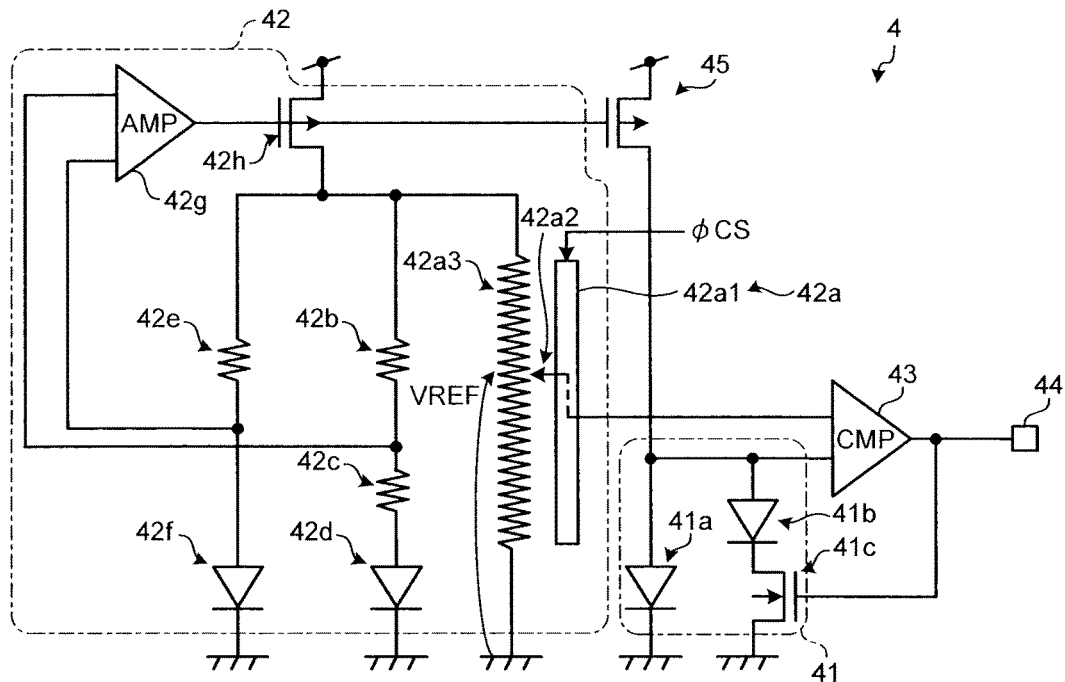
FIG. 7 is a view illustrating a configuration of a temperature detection circuit according to the basic form.

Specifically, the temperature detection circuit 4 is configured in such a manner illustrated in FIG. 7. FIG. 7 is a view illustrating a configuration of the temperature detection circuit 4.

The temperature detection circuit 4 includes a reference block 41, a generation unit 42, a comparator (CMP) 43, an output terminal 44, and a transistor 45. The temperature detection circuit 4 compares the potential of the reference block 41 and the reference potential and detects the temperature of the semiconductor device 1 according to a comparison result.

That is, potential supplied from the reference block 41 to the comparator 43 changes depending on the temperature. For example, the reference block 41 includes diodes 41a and 41b and a transistor 41c. The generation unit 42 generates the reference potential VREF and supplies the generated reference potential VREF to the comparator 43. For example, the generation unit 42 includes a variable resistance element 42a, resistances 42b, 42c, and 42e, diodes 42d and 42f, an amplifier 42g, and a transistor 42h. A current, which controls a variation of a resistance value due to a temperature variation, flows in the variable resistance element 42a and the variable resistance element 42a generates the reference potential VREF which has relatively low temperature dependence and supplies the generated reference potential VREF to the comparator 43. The comparator 43 compares the potential of the reference block 41 and the reference potential VREF and outputs a comparison result φCMP, from the output terminal 44, as a detection result of the temperature detection circuit 4. The comparator 43 outputs, as a detection result of detection of a temperature, a comparison result φCMP (=H level) indicating that the potential of the reference block 41 is higher than the reference potential VREF and outputs, as a detection result of non-detection of a temperature, a comparison result φCMP (=L level) indicating that the potential of the reference block 41 is lower than the reference potential. Thus, when the temperature (ambient temperature) of the semiconductor device 10 becomes higher than a set detection temperature, the temperature detection circuit 4 changes an output signal φCMP, which is an output from the comparator 43, from the L level to the H level.

In the temperature detection circuit 4 illustrated in FIG. 7, the reference potential VREF changes according to a resistance value of the variable resistance element 42a. The variable resistance element 42a includes a variable operation unit 42a1, a connection tap 42a2, and a resistance 42a3. According to the control value φCS, the variable operation unit 42a1 changes a position where the connection tap 42a2 is connected to the resistance 42a3. The reference potential VREF is potential which is set according to an extraction position from the resistance 42a3. For example, in a case where the control value φCS is a digital value, the value of the reference potential VREF can be changed between 0.5 V to 0.7 V by the digital value. For example, between 0.5 V to 0.7 V, the change can be made in a gradation corresponding to a 5-bit digital value, that is, in a step of 0.00625 V. For example, when the potential of the reference block 41 changes in a negative temperature characteristic, the variable operation unit 42a1 changes a position, where the connection tap 42a2 is connected to the resistance 42a3, closer to a side of ground potential as the detection temperature to be set becomes higher.

Note that when the potential of the reference block 41 changes in a positive temperature characteristic, the variable operation unit 42a1 may change a position, where the connection tap 42a2 is connected to the resistance 42a3, closer to the side of the ground potential as the detection temperature to be set becomes lower.

By making the reference potential VREF variable, the temperature detection circuit 4 can change the detection temperature which is a temperature at which the detection result changes from the non-detection (L level) to the detection (H level). As illustrated in FIG. 7, since the temperature detection circuit 4 is configured in a simple manner, dispersion in the detection temperature by the temperature detection circuit 4 may be increased.

Figure 8:
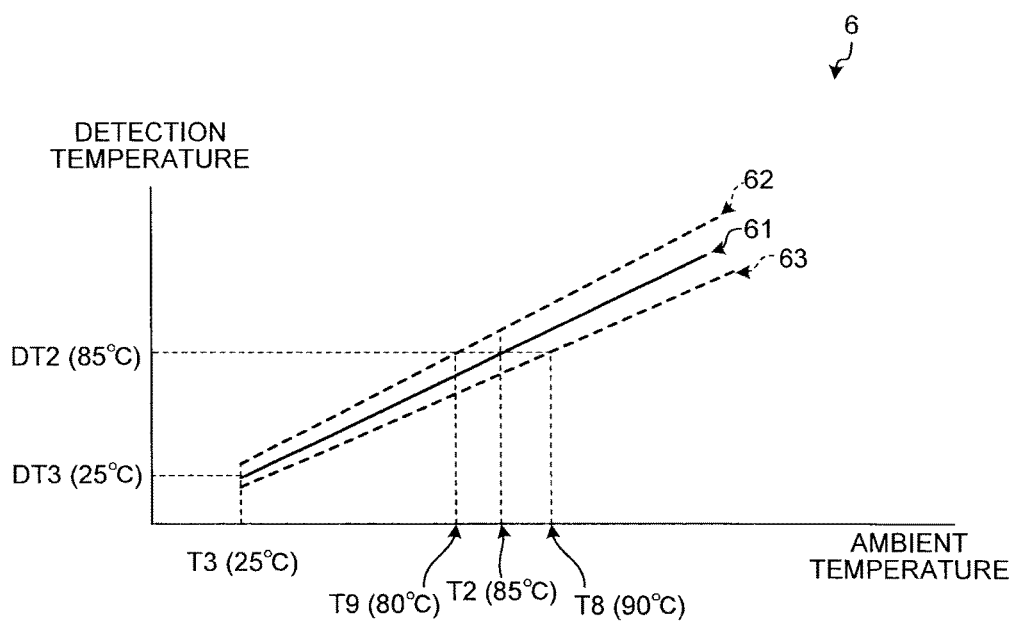
FIG. 8 is a chart illustrating a characteristic of the temperature detection circuit according to the basic form.

For example, the control unit 6 controls a permissible range of a temperature characteristic of the temperature detection circuit 4, such as what is illustrated in FIG. 8. FIG. 8 is a chart illustrating a temperature characteristic of the temperature detection circuit 4. In FIG. 8, a temperature characteristic 61 illustrated in a solid line indicates a designed value of an ambient temperature to be detected by the temperature detection circuit 4 in regard to the detection temperature. The control unit 6 performs control based on a detection operation of the temperature detection circuit 4. For example, in a case where the detection temperature is set at the DT2 (85° C.), the temperature detection circuit 4 is designed to detect that the ambient temperature is higher than the DT2 (85° C.) when the ambient temperature is higher than the T2 (85° C.). In FIG. 8, a temperature characteristic 62 of a lower limit temperature of the detected ambient temperature permitted as a detection error in regard to the set detection temperature and a temperature characteristic 63 of an upper limit temperature of the ambient temperature permitted as the detection error are respectively illustrated in dashed lines. For example, the detection temperature is set at the DT2 (such as 85° C.), on the temperature characteristic 62 of the lower limit temperature, the ambient temperature (80° C.) has about −5° C. of the detection error in regard to the detection temperature. On the temperature characteristic 63 of the upper limit temperature, the ambient temperature (90° C.) has about +5° C. of the detection error in regard to the detection temperature. That is, in a case of FIG. 8, a range from about −5° C. to about +5° C. of the detection error in regard to the detection temperature DT2 (such as 85° C.) is assumed as a permissible range of the temperature characteristic of the temperature detection circuit 4. In FIG. 8, in regard to the temperature characteristic 61 (solid line) of the designed value of the temperature detection circuit 4, the temperature characteristic 62 (dashed line) of the lower limit temperature and the temperature characteristic 63 (dashed line) of the upper limit temperature are illustrated as limits of the permissible range of an actual temperature characteristic of the temperature detection circuit 4.

Figure 9:
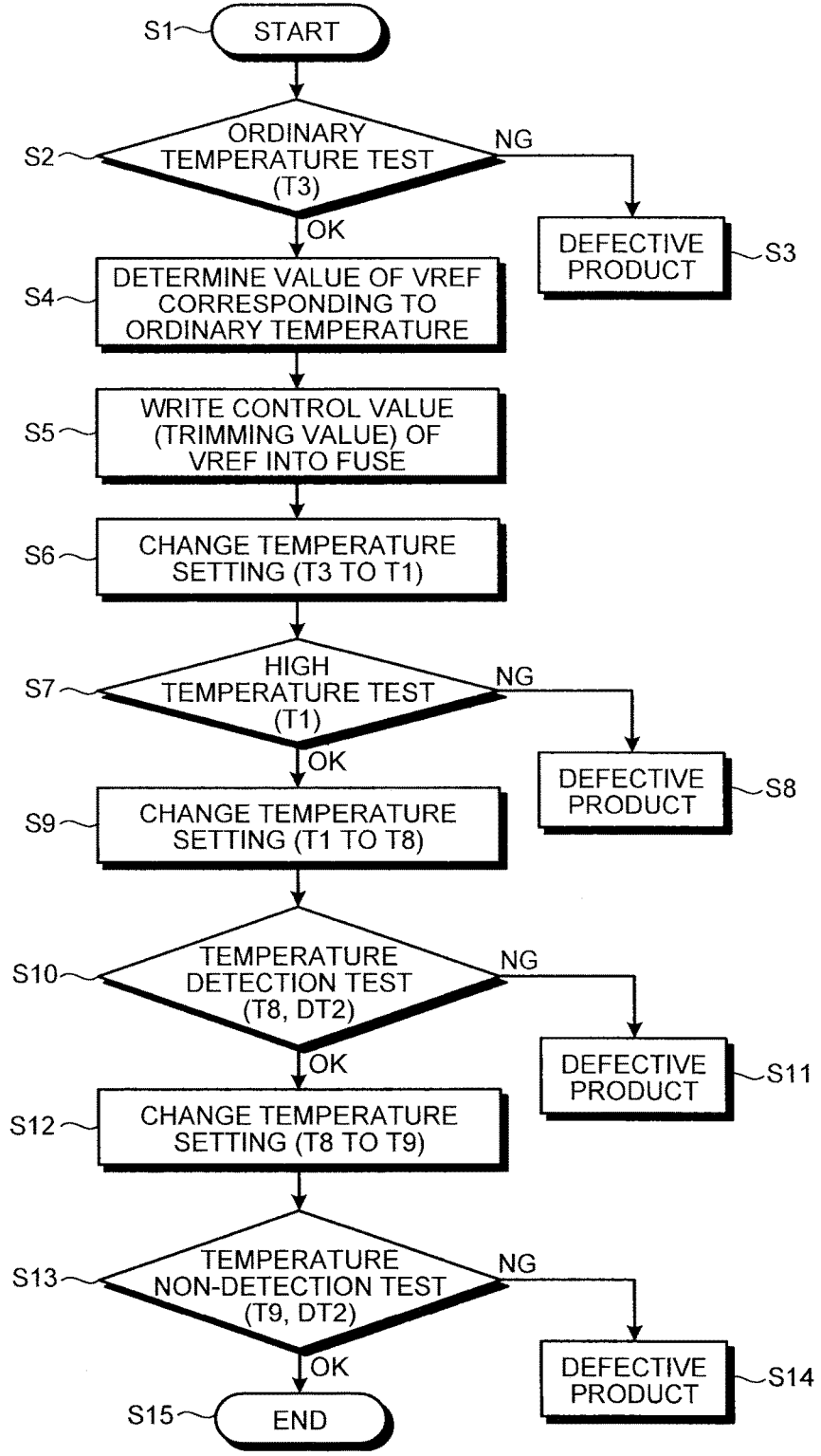
FIG. 9 is a flowchart illustrating a test method of the semiconductor device according to the basic form.
Figure 11A:
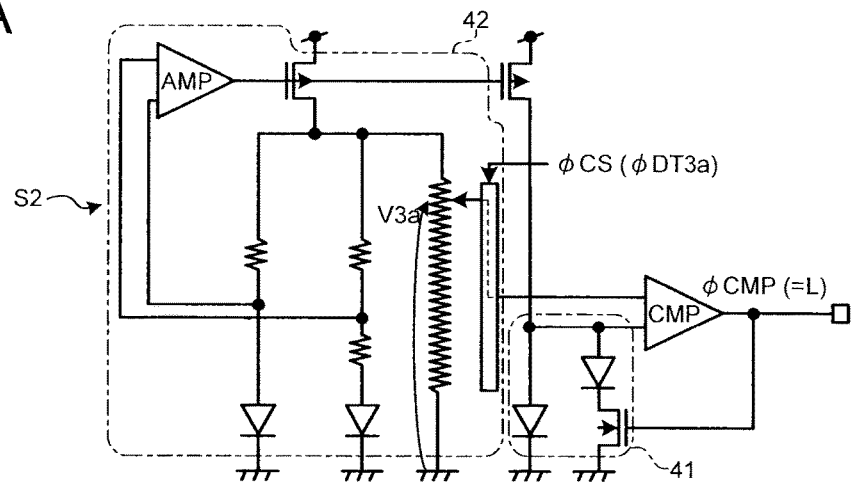
FIGS. 11A to 11C are views illustrating an operation of the temperature detection circuit according to the basic form.
Figure 11B:
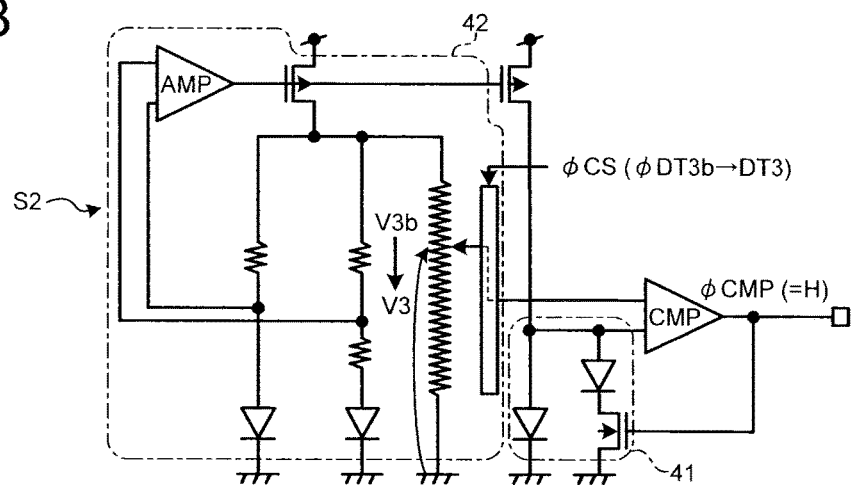
Figure 11C:
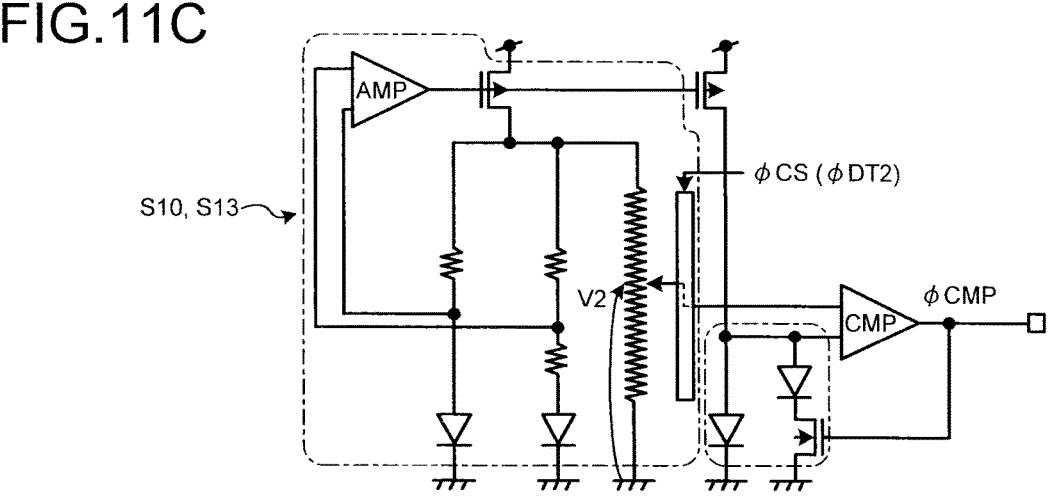

As illustrated in FIG. 8, to secure an appropriate temperature detection operation of the temperature detection circuit 4, it is necessary to test whether the temperature detection circuit 4 is operating within the permissible range and to reject a semiconductor device 10 as a defective product when the temperature detection circuit 4 is operating outside the permissible range. Specifically, a test illustrated in FIG. 9 to FIG. 11C is performed. FIG. 9 is a flowchart illustrating a test method of the semiconductor device 10. FIG. 10 is a chart illustrating the test method of the semiconductor device 10. FIGS. 11A to 11C are views illustrating an operation of the temperature detection circuit 4.

In the basic form, the semiconductor device 10 is provided to a tester (not illustrated) including a temperature varying function and the test is started (S1). First, at an ambient temperature of an ordinary temperature (25° C.), each function test is performed as an ordinary temperature test (S2). When a result of the ordinary temperature test is NG (NG in S2), the semiconductor device 10 is removed, as a defective product (S3), from an object to be shipped.

When a result of the ordinary temperature test is OK (OK in S2), the control unit 6 makes the temperature detection circuit 4 detect a temperature while serially switching a value of the reference potential VREF in the ordinary temperature (25° C.) state to a value selected from two or more values which are different from each other. Then, according to the detection result of the temperature detection circuit, the control unit 6 determines a value of the reference potential VREF corresponding to the ordinary temperature (25° C.) (S4).

For example, as candidates of a value V3 of the reference potential VREF corresponding to the ordinary temperature (25° C.), V3a and V3b are considered. In this case, as candidates of the control value φDT3 for the detection at the ordinary temperature, that is, at the detection temperature DT3, control values φDT3a and φDT3b corresponding to the values V3a and V3b of the reference potential VREF are prepared. In a case of FIG. 11A, the control value φDT3a is supplied to the generation unit 42 and a value of the reference potential VREF becomes V3a. Since the potential of the reference block 41 is lower than the value V3a of the reference potential VREF, the detection result φCMP of the temperature detection circuit 4 becomes the non-detection (L level). In a case of 11B, the control value φDT3b is supplied to the generation unit 42 and a value of the reference potential VREF becomes V3b. Since the potential of the reference block 41 is higher than the value V3b of the reference potential VREF, the detection result φCMP of the temperature detection circuit 4 becomes the detection (H level). Thus, the control unit 6 sets the value V3b as the value V3 of the reference potential VREF corresponding to the detection temperature DT3 and determines the control value φT3b as the control value φDT3 for the detection at the detection temperature DT3. The control unit 6 writes the determined control value (trimming value) φDT3 into the fuse 1 (S5).

Thus, an origin of the operation characteristic of the temperature detection circuit 4 can be matched to an actual operation condition. For example, a point (ambient temperature, detection temperature)=(T3, DT3) in the temperature characteristic illustrated in FIG. 8 can be set as the origin. A slope in the temperature characteristic is experimentally acquired in advance. Thus, when the origin (T3, DT3) is set, the temperature characteristic 61 of the designed value of the temperature detection circuit 4 can be predicted while being matched to the actual operation condition. Note that the origin (T3, DT3) is a point indicating the actual characteristic of the temperature detection circuit 4 but is treated approximately as a point on the temperature characteristic 61 of the designed value.

Also, for example, when a value of the reference potential VREF is changed in response to the temperature characteristic of the potential of the reference block 41, the value V3 (=V3b) of the reference potential VREF corresponding to the detection temperature DT3 (25° C.) can be approximately set as an origin in the change characteristic of the value of the VREF. When the origin (T3, V3) is set, since the slope of the temperature change in the potential of the reference block 41 is experimentally acquired in advance, for example, a value V2 of the reference potential VREF corresponding to the detection temperature DT2 (85° C.) can be predicted. Thus, the function module 8 functionally realized in the microprocessor (not illustrated) by the firmware FW reads the control value φDT3 from the fuse 1 and stores the read control value φDT3 into the register 2. Also, according to the control value φDT3 stored in the register 2, the function module 8 calculates a control value φDT2 to be used by the temperature detection circuit 4 in the normal mode and stores the calculated control value φDT2 into the register 3. By the control value φCS (φDT2) input from the register 3, the temperature detection circuit 4 sets the value V2 of the reference potential VREF in such a manner to detect the detection temperature DT2 (such as 85° C.) (see FIG. 11C).

By the tester, the ambient temperature of the semiconductor device 10 is increased from the ordinary temperature T3 (such as 25° C.) to a high temperature T1 (such as 105° C.) and the high temperature T1 is kept (S6). At the high temperature T1 (such as 105° C.), each function test is performed as a high temperature test (S7). When a result of the high temperature test is NG (NG in S7), the semiconductor device 10 is removed, as a defective product (S8), from an object to be shipped.

When a result of the high temperature test is OK (OK in S7), to test the temperature characteristic of the temperature detection circuit 4, the ambient temperature of the semiconductor device 10 is decreased from the high temperature T1 (such as 105° C.) to a temperature T8 (such as 90° C.) by the tester and the temperature T8 is kept (S9). The temperature T8 is a temperature corresponding to the upper limit temperature permissible as the detection error in regard to the detection temperature DT2 (such as 85° C.) to be detected in the normal mode of the temperature detection circuit 4 (see FIG. 8).

Then, it is tested whether the temperature detection circuit 4 detects a temperature appropriately (S10). Here, the ambient temperature T8 (such as 90° C.) is higher than the detection temperature DT2 (such as 85° C.) set in the temperature detection circuit 4. Thus, when the temperature detection circuit 4 is operating within the permissible range, the detection result φCMP of the temperature detection circuit 4 becomes the detection (H level) (see FIG. 11C). The control unit 6 refers to the detection result φCMP, which is stored in the register 5, of the temperature detection circuit 4. When the detection result φCMP of the temperature detection circuit 4 is the non-detection (L level), the control unit 6 determines NG (NG in S10) and removes the semiconductor device 10, as a defective product (S11), from an object to be shipped. When the detection result φCMP of the temperature detection circuit 4 is the detection (H level), the control unit 6 determines OK (OK in S10) and goes to processing S12.

Then, to test the temperature characteristic of the temperature detection circuit 4, the ambient temperature of the semiconductor device 10 is decreased from the temperature T8 (such as 90° C.) to a temperature T9 (such as 80° C.) by the tester and the temperature T9 is kept (S12). The temperature T9 is a temperature corresponding to the lower limit temperature permissible as the detection error in regard to the detection temperature DT2 (such as 85° C.) to be detected in the normal mode of the temperature detection circuit 4 (see FIG. 8).

Then, it is tested whether the temperature detection circuit 4 detects a temperature appropriately (S13). Here, the ambient temperature T9 (such as 80° C.) is lower than the detection temperature DT2 (such as 85° C.) set in the temperature detection circuit 4. Thus, when the temperature detection circuit 4 is operating within the permissible range, the detection result φCMP of the temperature detection circuit 4 becomes the non-detection (L level) (see FIG. 11C). The control unit 6 refers to the detection result φCMP, which is stored in the register 5, of the temperature detection circuit 4. When the detection result φCMP of the temperature detection circuit 4 is the detection (H level), the control unit 6 determines NG (NG in S13) and removes the semiconductor device 10, as a defective product (S14), from an object to be shipped. When the detection result φCMP of the temperature detection circuit 4 is the non-detection (L level), the control unit 6 determines OK (OK in S13) and ends the processing (S15).

In the basic form, as illustrated in FIG. 9 and FIG. 10, other than a shipping test (two temperatures) in the temperature setting at the ordinary temperature T3 and the temperature setting at the high temperature T1, a temperature detection function test (two temperatures) in the temperature setting at the temperature T8 and the temperature setting at the temperature T9 becomes necessary. That is, the temperature setting at the total four different temperatures becomes necessary, and thus, the test time may be increased greatly.

Thus, in the embodiment, by serially switching a value of reference potential to a value selected from a plurality of values different from each other while a temperature of a semiconductor device 100 is kept at a high temperature T1 and testing an operation of a temperature detection circuit 4, it is intended to reduce the number of times of necessary temperature setting to two and to make a test time shorter. In the following, a point different from the basic form will be described.

Figure 1:
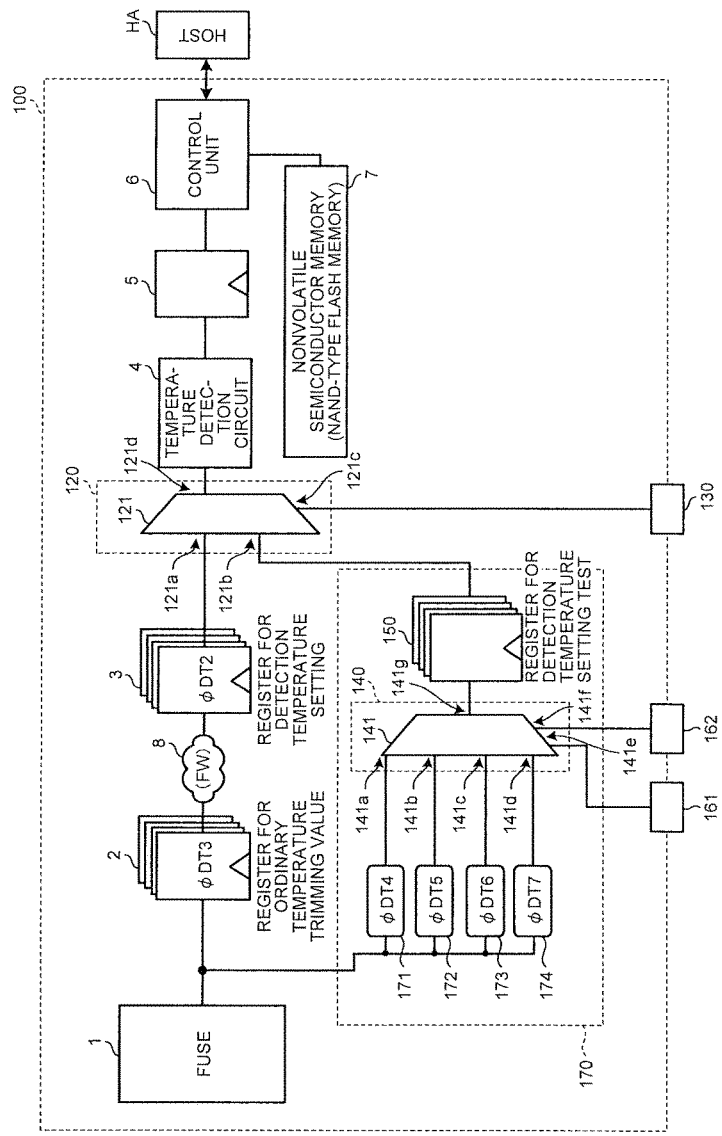
FIG. 1 is a view illustrating a configuration of a semiconductor device according to an embodiment.

Specifically, as illustrated in FIG. 1, the semiconductor device 100 includes a switching unit (first switching unit) 120, a pad (first pad) 130, a test circuit 170, and pads (second pad) 161 and 162.

The switching unit 120 performs switching to a first connection state in a test mode and switching to a second connection state in a normal mode. The first connection state is a connection state in which a plurality of control values φDT4, φDT5, φDT6, and φDT7 is serially supplied from the test circuit 170 to a generation unit 42 of a temperature detection circuit 4. The second connection state is a connection state in which the control value φDT2 corresponding to a detection temperature DT2 is supplied from a register 3 to the generation unit 42 (see FIG. 7) of the temperature detection circuit 4.

The pad 130 is electrically connected to a control terminal of the switching unit 120. When receiving a test mode signal through the pad 130, the switching unit 120 performs switching to the first connection state and when not receiving a test mode signal through the pad 130, the switching unit 120 performs switching to the second connection state.

For example, the switching unit 120 includes a multiplexer 121. The multiplexer 121 includes input terminals 121a and 121b, a control terminal 121c, and an output terminal 121d. When receiving a signal at an H level through the pad 130, the multiplexer 121 recognizes that the test mode signal is received. Then, the multiplexer 121 selects a control value received with the input terminal 121b and outputs the selected control value from the output terminal 121d. Thus, the multiplexer 121 performs switching to the first connection state. When receiving a signal at an L level through the pad 130 or when receiving no signal, the multiplexer 121 recognizes that the test mode signal is not received. Then, the multiplexer 121 selects a control value received with the input terminal 121a and outputs the selected control value from the output terminal 121d. Thus, the multiplexer 121 performs switching to the second connection state.

In the test mode, the test circuit 170 tests an operation of the temperature detection circuit 4 by serially switching a value of the reference potential VREF to a value selected from a plurality of values V4 to V7 (see FIG. 5), which is different from each other, while the temperature (ambient temperature) of the semiconductor device 100 is kept at the high temperature T1. The test circuit 170 includes registers 171 to 174, a switching unit (second switching unit) 140, and a register (second register) 150.

A function module 8 functionally realized in a microprocessor (not illustrated) by a firmware FW reads the control values φDT4 to φDT7 from the fuse 1 and stores the read control values respectively into the registers 171 to 174. The register 171 stores the control value φDT4 to control a value of the reference potential VREF to V4. The control value φDT4 corresponds to a detection temperature φDT4 (such as 90° C.) of the temperature detection circuit 4 (see FIG. 2). The registers 172 stores the control value φDT5 to control a value of the reference potential VREF to V5. The control value φDT5 corresponds to a detection temperature DT5 (such as 95° C.) of the temperature detection circuit 4 (see FIG. 2). The registers 173 stores the control value φDT6 to control a value of the reference potential VREF to V6. The control value φDT6 corresponds to a detection temperature DT6 (such as 115° C.) of the temperature detection circuit 4 (see FIG. 2). The registers 174 stores the control value φDT7 to control a value of the reference potential VREF to V7. The control value φDT7 corresponds to a detection temperature DT7 (such as 120° C.) of the temperature detection circuit 4 (see FIG. 2). That is, in respect to the detection temperatures DT4 to DT7, from a slope of a temperature change, which slope is experimentally acquired, of potential of a reference block 41, a control unit 6 respectively predicts the values (V4 to V7) of the reference potential VREF in which the detection result φCMP is switched to the detection (H level) when the ambient temperature reaches the detection temperature. Then, the control unit 6 stores, into the registers 171 to 174, the control values (φDT4 to φDT7) to control a value of the reference potential VREF to the prediction values.

The switching unit 140 selects any of the plurality of control values φDT4 to φDT7 input from the registers 171 to 174 and outputs the selected control value to the register 150 (register for detection temperature setting test). The plurality of control values φDT4 to φDT7 corresponds to the plurality of values V4 to V7 to be selected as a value of the reference potential VREF. The switching unit 140 serially selects the plurality of control values φDT4 to φDT7 and outputs the selected control value to the register 150.

Pads 161 and 162 are electrically connected to a control terminal of the switching unit 140. According to a select signal received through the pads 161 and 162, the switching unit 140 selects any of the plurality of control values φDT4 to φDT7.

For example, the switching unit 140 includes a multiplexer 141. The multiplexer 141 includes input terminals 141a to 141d, control terminals 141e and 141f, and an output terminal 141g. When receiving a signal of (L, L) through the pads 161 and 162, the multiplexer 141 selects the control value φDT4 received with the input terminal 141a and outputs the selected control value from the output terminal 141g to the register 150. When receiving a signal of (L, H) through the pads 161 and 162, the multiplexer 141 selects the control value φDT5 received with the input terminal 141b and outputs the selected control value from the output terminal 141g to the register 150. When receiving a signal of (H, L) through the pads 161 and 162, the multiplexer 141 selects the control value φDT6 received with the input terminal 141c and outputs the selected control value from the output terminal 141g to the register 150. When receiving a signal of (H, H) through the pads 161 and 162, the multiplexer 141 selects the control value φDT7 received with the input terminal 141d and outputs the selected control value from the output terminal 141g to the register 150.

Figure 2:
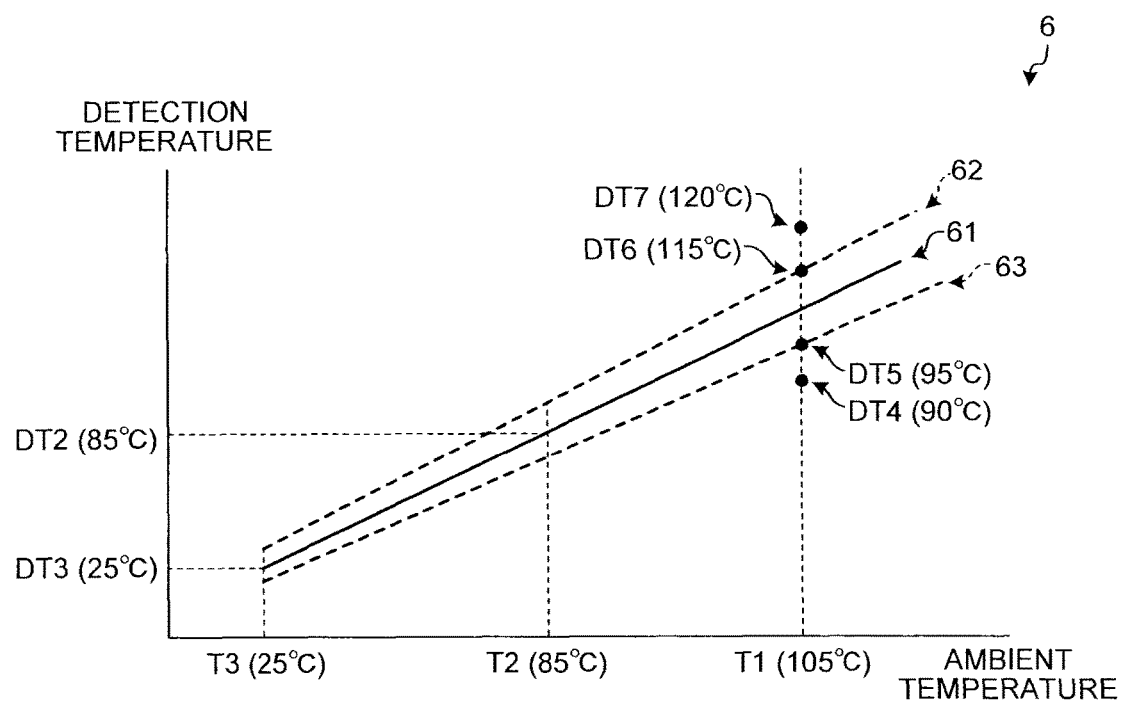
FIG. 2 is a chart illustrating a characteristic of a temperature detection circuit according to the embodiment.

Combinations of the plurality of detection temperatures DT4 to DT7 and the ambient temperature T1, which combinations are tested by the test circuit 170, are distributed in such a manner illustrated in FIG. 2 in regard to a temperature characteristic 61 of a designed value of the temperature detection circuit 4. FIG. 2 is a chart illustrating a characteristic of the temperature detection circuit 4. On a straight line of the ambient temperature T1 illustrated in FIG. 2, (T1, DT4) is located on a low temperature side of a temperature characteristic 63 of an upper limit temperature. The detection temperature DT4 is a detection temperature at which a temperature lower than the ambient temperature T1 is an upper limit of the detection error. The detection temperature DT4 is, for example, a detection temperature 90° C. On the straight line of the ambient temperature T1 illustrated in FIG. 2, (T1, DT5) is located in a vicinity of an intersection of the straight line of the ambient temperature T1 with a straight line of the temperature characteristic 63 of the upper limit temperature. The detection temperature DT5 is a detection temperature at which a vicinity of the ambient temperature T1 is an upper limit of the detection error. The detection temperature DT5 is, for example, a detection temperature 95° C. On the straight line of the ambient temperature T1 illustrated in FIG. 2, (T1, DT6) is located in a vicinity of an intersection of the straight line of the ambient temperature T1 with a straight line of a temperature characteristic 62 of a lower limit temperature. The detection temperature DT6 is a detection temperature at which a vicinity of the ambient temperature T1 is a lower limit of the detection error. The detection temperature DT6 is, for example, a detection temperature 115° C. On the straight line of the ambient temperature T1 illustrated in FIG. 2, (T1, DT7) is located on a high temperature side of the temperature characteristic 62 of the lower limit temperature. The detection temperature DT7 is a detection temperature at which a temperature higher than the ambient temperature T1 is an upper limit of the detection error. The detection temperature DT7 is, for example, a detection temperature 120° C.

Figure 3:
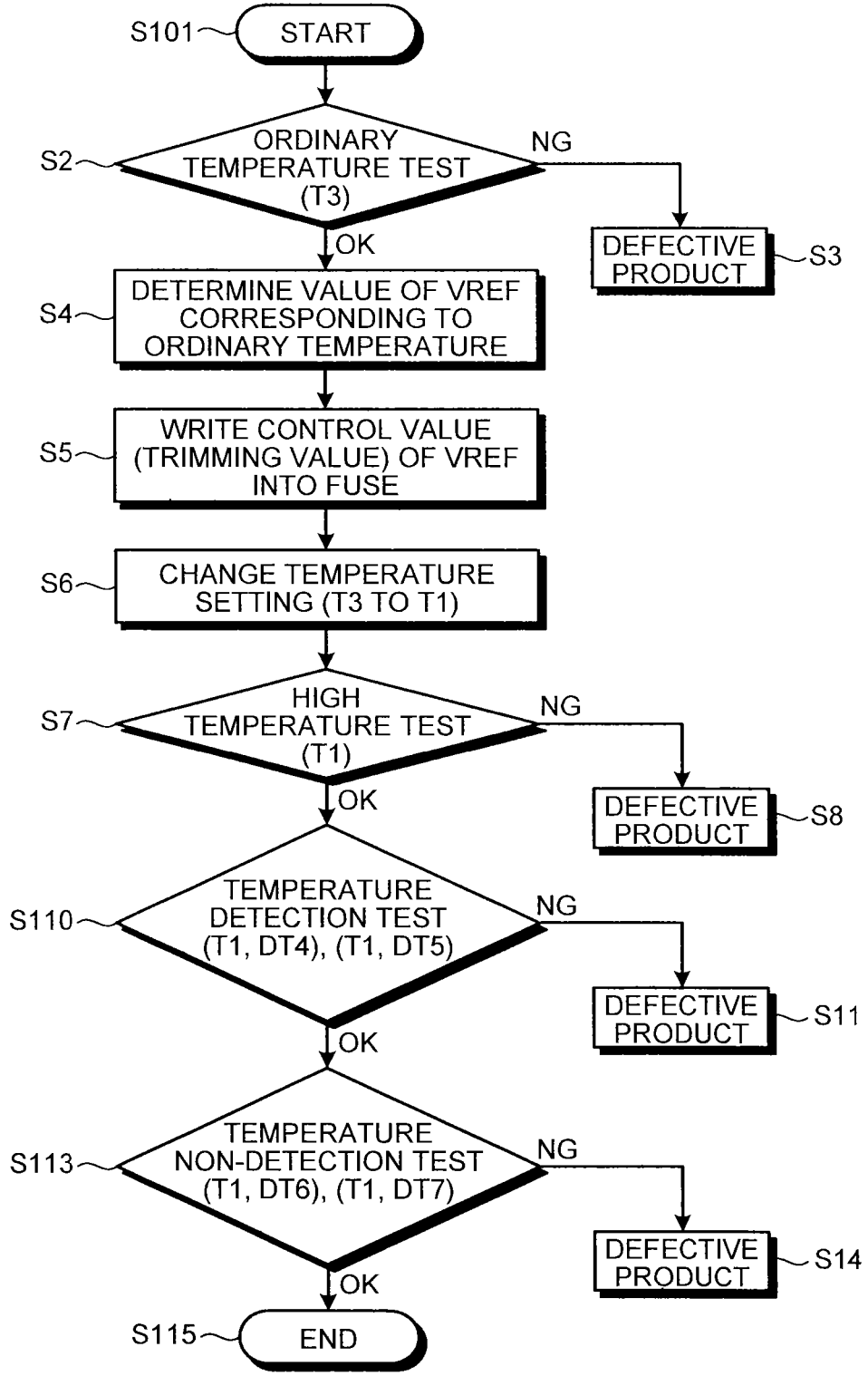
FIG. 3 is a flowchart illustrating a test method of the semiconductor device according to the embodiment.
Figure 5A:
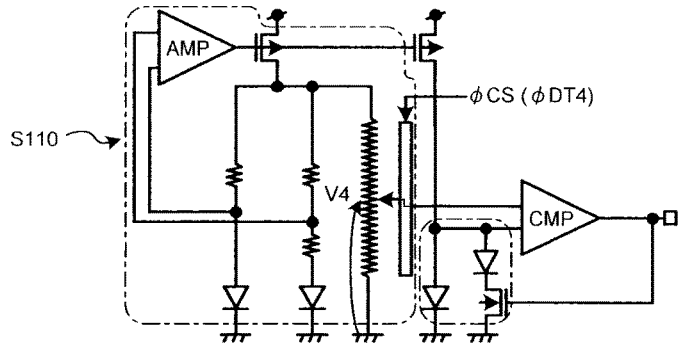
FIGS. 5A to 5D are views illustrating an operation of the temperature detection circuit according to the embodiment.
Figure 5B:
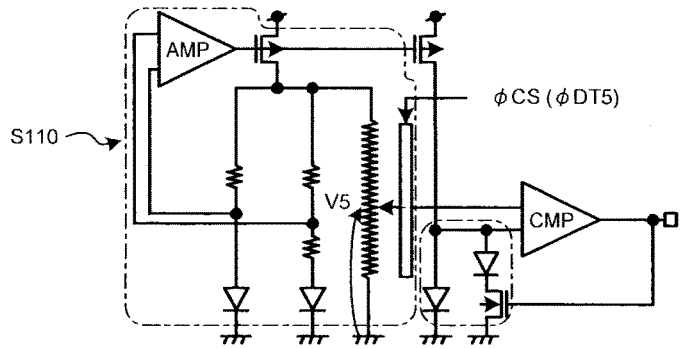
Figure 5C:
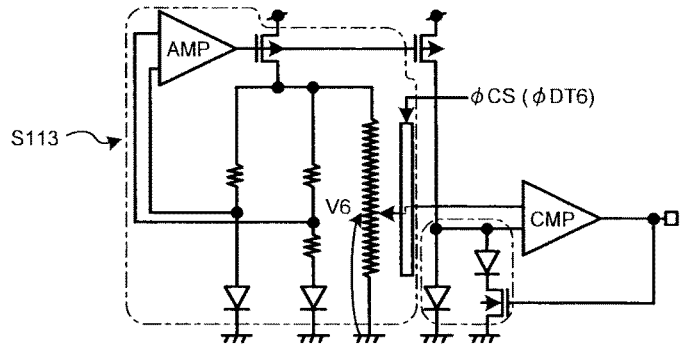
Figure 5D:
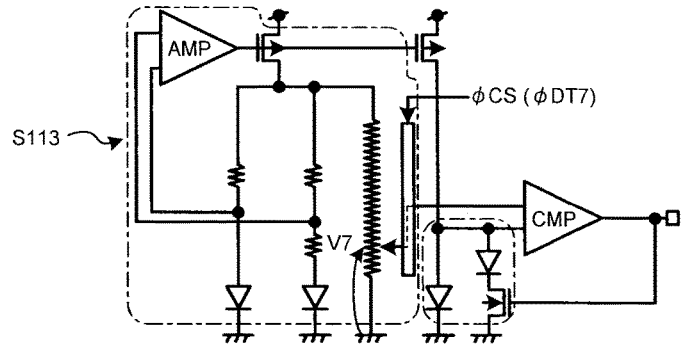

Specifically, as illustrated in FIG. 3 to FIG. 5D, a test different from that of the basic form in the following point is performed. FIG. 3 is a flowchart illustrating a test method of the semiconductor device 100. FIG. 4 is a chart illustrating the test method of the semiconductor device 100. FIGS. 5A to 5D are views illustrating an operation of the temperature detection circuit 4.

In the embodiment, S9 and S12 (see FIG. 9) are omitted and S101, S110, S113, and S115 are performed instead of S1, S10, S13, and S15 (see FIG. 9).

The semiconductor device 10 is provided to a tester (not illustrated) including a temperature varying function and the test is started. Here, since a test mode signal is not received through the pad 130, the switching unit 120 performs switching to the second connection state. The second connection state is a connection state in which the control value φDT2 corresponding to the detection temperature DT2 is supplied from the register 3 to the generation unit 42 of the temperature detection circuit 4.

After a high temperature test (S7) is performed, to make the temperature detection circuit 4 the test mode while keeping the ambient temperature, control by the pad 130 is performed. To the pad 130, a signal at the H level may be supplied as the test mode signal from the tester (not illustrated). When receiving the test mode signal through the pad 130, the switching unit 120 performs switching to the first connection state. The first connection state is a connection state in which a plurality of control values is serially supplied from the test circuit 170 to the generation unit 42 of the temperature detection circuit 4. Here, to select a plurality of control value serially, a select signal may be supplied from the tester to the pads 161 and 162.

Then, it is tested whether the temperature detection circuit 4 detects a temperature appropriately (S110).

Specifically, the switching unit 140 receives a select signal (L, L) through the pads 161 and 162 and selects the control value φDT4. The test circuit 170 supplies the control value φDT4 corresponding to the detection temperature DT4 to the generation unit 42 of the temperature detection circuit 4. The ambient temperature T1 (such as 105° C.) is higher than the detection temperature DT4 (such as 90° C.) set in the temperature detection circuit 4. Thus, when the temperature detection circuit 4 is operating within the permissible range, the detection result φCMP of the temperature detection circuit 4 becomes the detection (H level) (see FIG. 5A). The control unit 6 refers to the detection result φCMP, which is stored in a register 5, of the temperature detection circuit 4. When the detection result φCMP of the temperature detection circuit 4 is non-detection (L level), the control unit 6 determines NG (NG in S110) and removes the semiconductor device 10, as a defective product (S11), from an object to be shipped.

Also, the switching unit 140 receives a select signal (L, H) through the pads 161 and 162 and selects the control value φDT5 corresponding to the detection temperature DT5. The test circuit 170 supplies the control value φDT5 to the generation unit 42 of the temperature detection circuit 4. The ambient temperature T1 (such as 105° C.) is higher than the detection temperature DT5 (such as 95° C.) set in the temperature detection circuit 4. Thus, when the temperature detection circuit 4 is operating within the permissible range, the detection result φCMP of the temperature detection circuit 4 becomes the detection (H level) (see FIG. 5B). The control unit 6 refers to the detection result φCMP, which is stored in the register 5, of the temperature detection circuit 4. When the detection result φCMP of the temperature detection circuit 4 is the non-detection (L level), the control unit 6 determines NG (NG in S110) and removes the semiconductor device 10, as a defective product (S11), from an object to be shipped. When the detection result φCMP of the temperature detection circuit 4 is the detection (H level), the control unit 6 determines OK (OK in S110) and goes to processing S113.

Also, it is tested whether the temperature detection circuit 4 detects a temperature appropriately in respect to a different control value (S113).

Specifically, the switching unit 140 receives a select signal (H, L) through the pads 161 and 162 and selects the control value φDT6 corresponding to the detection temperature DT6. The test circuit 170 supplies the control value φDT6 to the generation unit 42 of the temperature detection circuit 4. The ambient temperature T1 (such as 105° C.) is lower than the detection temperature DT6 (such as 115° C.) set in the temperature detection circuit 4. Thus, when the temperature detection circuit 4 is operating within the permissible range, the detection result φCMP of the temperature detection circuit 4 becomes the non-detection (L level) (see FIG. 5C). The control unit 6 refers to the detection result φCMP, which is stored in the register 5, of the temperature detection circuit 4. When the detection result φCMP of the temperature detection circuit 4 is detection (H level), the control unit 6 determines NG (NG in S113) and removes the semiconductor device 10, as a defective product (S14), from an object to be shipped.

Also, the switching unit 140 receives a select signal (H, H) through the pads 161 and 162 and selects the control value φDT7 corresponding to the detection temperature DT7. The test circuit 170 supplies the control value φDT7 to the generation unit 42 of the temperature detection circuit 4. The ambient temperature T1 (such as 105° C.) is lower than the detection temperature DT7 (such as 120° C.) set in the temperature detection circuit 4. Thus, when the temperature detection circuit 4 is operating within the permissible range, the detection result φCMP of the temperature detection circuit 4 becomes the non-detection (L level) (see FIG. 5D). The control unit 6 refers to the detection result φCMP, which is stored in the register 5, of the temperature detection circuit 4. When the detection result φCMP of the temperature detection circuit 4 is detection (H level), the control unit 6 determines NG (NG in S113) and removes the semiconductor device 10, as a defective product (S14), from an object to be shipped.

When the detection result φCMP of the temperature detection circuit 4 is the non-detection (L level), the control unit 6 determines OK (OK in S113) and ends the processing. Here, to make the temperature detection circuit 4 the normal mode, control by the pad 130 is released. Since a test mode signal is not received through the pad 130, the switching unit 120 performs switching to the second connection state (S115). The second connection state is a connection state in which the control value φDT2 corresponding to the detection temperature DT2 is supplied from the register 3 to the generation unit 42 of the temperature detection circuit 4.

The detection temperature of the temperature detection circuit 4 is set at the detection temperature DT2 (such as 85° C.) in the normal mode. Thus, also in the test method illustrated in FIG. 3, it is tested whether the ambient temperature to be detected by the temperature detection circuit 4 is between the lower limit temperature and the upper limit temperature which are permissible as the detection error in regard to the detection temperature DT2. However, it is not necessary to perform this test by actually setting the ambient temperature at the lower limit temperature and the upper limit temperature. In consideration of the lower limit temperature and the upper limit temperature at the detection temperature DT2, the detection temperature DT5 to be detected and the detection temperature DT6 not to be detected in a case where the ambient temperature is the temperature T1 are set. By checking the detection and non-detection with these detection temperatures, substantially the same test can be performed. Note that a difference between the detection temperature DT2 and the corresponding lower limit temperature and upper limit temperature may be substantially the same with a difference between the temperature T1 and the detection temperatures DT5 and DT6 or may be different therefrom. By experimentally finding out tendencies of the temperature characteristics of the limits of the permissible range deviated from the temperature characteristic 61 of the designed value of the temperature detection circuit 4 (slope of temperature characteristic of dashed line illustrated in FIG. 2), the detection temperatures DT6 and DT5 corresponding to the lower limit temperature and the upper limit temperature at the detection temperature DT2 can be calculated.

As described above, in the semiconductor device 100 in the present embodiment, the test circuit 170 tests, in the test mode, an operation of the temperature detection circuit 4 by serially switching a value of the reference potential VREF to a value selected from a plurality of values, which is different from each other, while a temperature of the semiconductor device 100 is kept at the temperature T1. The temperature T1 is a temperature used for the high temperature test of the nonvolatile semiconductor memory 7. In the basic form, the ambient temperature is changed while the detection temperature is kept constant, whereby a state in which the detection temperature and the ambient temperature are different from each other for a predetermined temperature is caused and an operation of the temperature detection circuit 4 is tested. On the contrary, in the present embodiment, instead of the ambient temperature (while ambient temperature is kept constant), the detection temperature is changed, whereby a state in which the detection temperature and the ambient temperature are different from each other for a predetermined temperature is caused and an operation of the temperature detection circuit 4 is tested. Thus, the number of times of temperature setting necessary for the test of the semiconductor device 100 can be reduced to two and the test time of the semiconductor device 100 can be reduced greatly.

Also, in the semiconductor device 100 in the present embodiment, in a case where the detection result φCMP of the temperature detection circuit 4 in a first state is non-detection of a temperature (L level) and where the detection result φCMP of the temperature detection circuit 4 in a second state is detection of a temperature (H level), the control unit 6 determines that the temperature detection circuit 4 is operating within the permissible range. The first state is a state in which the reference potential VREF is switched to the value V5. The value V5 is a value (value controlled by control value φDT5) corresponding to the detection temperature DT5 at which an upper limit of the detection error is a vicinity of the temperature T1 (temperature used for high temperature test). The second state is a state in which the reference potential VREF is switched to the value V6. The value V6 is a value (value controlled by control value φDT6) corresponding to the detection temperature DT6 at which a lower limit of the detection error is a vicinity of the temperature T1 (temperature used for high temperature test). In a case where the detection result φCMP of the temperature detection circuit 4 in the first state is the non-detection of a temperature (L level) and where the detection result φCMP of the temperature detection circuit 4 in the second state is the non-detection of a temperature (L level), the control unit 6 determines that the temperature detection circuit 4 is operating outside the permissible range. In a case where the detection result φCMP of the temperature detection circuit 4 in the first state is the detection of a temperature (H level) and where the detection result φCMP of the temperature detection circuit 4 in the second state is the detection of a temperature (H level), the control unit 6 determines that the temperature detection circuit 4 is operating outside the permissible range. That is, while a temperature of the semiconductor device 100 is kept at the temperature T1, a value of the reference potential VREF is serially switched to a value selected from a plurality of values which is different from each other and a detection result of the temperature detection circuit 4 is checked. Thus, it is possible to test an operation of the temperature detection circuit 4 in respect to a plurality of different detection temperatures while keeping the ambient temperature T1 and to test whether the temperature detection circuit 4 is operating within the permissible range.

Also, in the semiconductor device 100 in the present embodiment, in a case where the detection result φCMP of the temperature detection circuit 4 in a third state is the detection of a temperature (H level), the control unit 6 determines that the temperature detection circuit 4 is operating outside the permissible range. The third state is a state in which the reference potential VREF is switched to the value V4. The value V4 is a value (value controlled by control value φDT4) corresponding to the detection temperature DT4 at which an upper limit of the detection error is a temperature lower than the temperature T1 (temperature used for high temperature test). In a case where the detection result of the temperature detection circuit 4 in a fourth state is the non-detection of a temperature, the control unit 6 determines that the temperature detection circuit 4 is operating outside the permissible range. The fourth state is a state in which the reference potential VREF is switched to the value V7. The value V7 is a value (value controlled by control value φDT7) corresponding to the detection temperature DT7 at which a lower limit of the detection error is a temperature higher than the temperature T1 (temperature used for high temperature test). Thus, it is possible to test an operation of the temperature detection circuit 4 in respect to a plurality of detection temperatures outside the permissible range while keeping the ambient temperature T1 and to check whether the temperature detection circuit 4 is operating within the permissible range.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor device comprising:
    a temperature detection circuit configured to detect whether or not a temperature reaches a detection temperature set to the temperature detection circuit by comparing potential of a reference block and reference potential, the potential of the reference block corresponding to a temperature to be detected, the reference potential corresponding to the detection temperature, the reference potential being varied by a control signal, the temperature detection circuit including the reference block, a generation unit configured to generate the reference potential with a value corresponding to a control value, and a comparator configured to compare the potential of the reference block and the reference potential and to output a comparison result as a detection result of the temperature detection circuit;
    a test circuit configured to test, in a test mode, an operation of the temperature detection circuit by changing the control signal so as to serially switch a value of the reference potential to a value selected from a plurality of values, while a temperature of the semiconductor device is kept at a first temperature, the plurality of values being different from each other, the plurality of values being values according to a permissible range of a detection error of the temperature detection circuit;
    a first register configured to hold a control value corresponding to a second temperature to be detected in a normal mode; and
    a first switching unit configured to perform, in the test mode, switching to a first connection state in which a plurality of control values corresponding to the plurality of values is serially supplied from the test circuit to the generation unit and to perform, in the normal mode, switching to a second connection state in which the control value corresponding to the second temperature is supplied from the first register to the generation unit.

2. The semiconductor device according to claim 1, further comprising a nonvolatile semiconductor memory,
    wherein the first temperature is a temperature used for a high temperature test of the nonvolatile semiconductor memory.

3. The semiconductor device according to claim 1, wherein the potential of the reference block changes depending on a temperature, and
    the temperature detection circuit detects whether or not a temperature reaches the detection temperature according to a comparison result between the potential of the reference block and the reference potential.

4. The semiconductor device according to claim 3, further comprising a control unit configured to determine whether or not the temperature detection circuit is operating within a permissible range according to a detection result of the temperature detection circuit.

5. The semiconductor device according to claim 4, wherein the plurality of values includes:
a first value corresponding to a detection temperature at which a vicinity of the first temperature is an upper limit of a detection error; and
a second value corresponding to a detection temperature at which a vicinity of the first temperature is a lower limit of the detection error, and
in a case where a detection result of the temperature detection circuit in a first state, in which the reference potential is switched to the first value, is non-detection of a temperature and a detection result of the temperature detection circuit in a second state, in which the reference potential is switched to the second value, is detection of a temperature, the control unit determines that the temperature detection circuit is operating within the permissible range;
in a case where a detection result of the temperature detection circuit in the first state is the non-detection of a temperature and a detection result of the temperature detection circuit in the second state is the non-detection of a temperature, the control unit determines that the temperature detection circuit is operating outside the permissible range; and
in a case where a detection result of the temperature detection circuit in the first state is the detection of a temperature and a detection result of the temperature detection circuit in the second state is the detection of a temperature, the control unit determines that the temperature detection circuit is operating outside the permissible range.

6. The semiconductor device according to claim 5, wherein the plurality of values further includes:
a third value corresponding to a detection temperature at which a temperature lower than the first temperature is an upper limit of the detection error; and
a fourth value corresponding to a detection temperature at which a temperature higher than the first temperature is a lower limit of the detection error, and
in a case where a detection result of the temperature detection circuit in a third state, in which the reference potential is switched to the third value, is the detection of a temperature, the control unit determines that the temperature detection circuit is operating outside the permissible range; and
in a case where a detection result of the temperature detection circuit in a fourth state, in which the reference potential is switched to the fourth value, is the non-detection of a temperature, the control unit determines that the temperature detection circuit is operating outside the permissible range.

7. The semiconductor device according to claim 1, wherein
the comparator outputs, as a detection result of the detection of a temperature, a comparison result indicating that the potential of the reference block is higher than the reference potential and outputs, as a detection result of the non-detection of a temperature, a comparison result indicating that the potential of the reference block is lower than the reference potential.

8. The semiconductor device according to claim 1, further comprising a first pad electrically connected to a control terminal of the first switching unit,
wherein, when receiving a test mode signal through the first pad, the first switching unit performs switching to the first connection state and when not receiving the test mode signal through the first pad, the first switching unit performs switching to the second connection state.

9. The semiconductor device according to claim 1, wherein the test circuit includes:
a second switching unit configured to select a value of the plurality of control values corresponding to the plurality of values and to output the selected control value; and
a second register configured to hold the control value output from the second switching unit as a control value to be supplied to the generation unit in the test mode.

10. The semiconductor device according to claim 9, further comprising a second pad electrically connected to a control terminal of the second switching unit,
wherein the second switching unit selects any of the plurality of control values corresponding to the plurality of values according to a select signal received through the second pad.

11. The semiconductor device according to claim 1, further comprising a nonvolatile semiconductor memory,
wherein the semiconductor device is a memory card, and the temperature detection circuit detects a temperature of the memory card.

12. A test method of a temperature detection circuit in a semiconductor device including a temperature detection circuit configured to compare potential of a reference block and reference potential and to detect whether or not a temperature reaches a detection temperature set to the temperature detection circuit, the potential of the reference block corresponding to a temperature to be detected, the reference potential corresponding to the detection temperature, the reference potential being varied by a control signal, the temperature detection circuit including the reference block, a generation unit configured to generate the reference potential with a value corresponding to a control value, and a comparator configured to compare the potential of the reference block and the reference potential and to output a comparison result as a detection result of the temperature detection circuit, the method comprising:
testing, in a test mode, an operation of the temperature detection circuit by changing the control signal so as to serially switch a value of the reference potential to a value selected from a plurality of values, while a temperature of the semiconductor device is kept at a first temperature, the plurality of values being different from each other, the plurality of values being values according to a permissible range of a detection error of the temperature detection circuit;
holding a control value, into a first register, corresponding to a second temperature to be detected in a normal mode;
switching, in the test mode, to a first connection state in which a plurality of control values corresponding to the plurality of values is serially supplied from the test circuit to the generation unit; and
switching, in the normal mode, to a second connection state in which the control value corresponding to the second temperature is supplied from the first register to the generation unit.

13. The test method according to claim 12, wherein the semiconductor device further includes a nonvolatile semiconductor memory, and the testing includes:
  performing a high temperature test of the nonvolatile semiconductor memory while keeping the temperature of the semiconductor device at the first temperature; and
  making the temperature detection circuit detect a temperature while serially switching a value of the reference potential to a value selected from the plurality of values, which are different from each other, with the temperature of the semiconductor device being kept at the first temperature.

14. The test method according to claim 12, wherein the testing includes:
  making the temperature detection circuit detect whether or not a temperature reaches the detection temperature while serially switching a value of the reference potential to a value selected from the plurality of values, with the temperature of the semiconductor device being kept at the first temperature; and
  determining whether or not the temperature detection circuit is operating within the permissible range according to a detection result of the temperature detection circuit.

15. The test method according to claim 14, wherein the plurality of values includes:
  a first value corresponding to the detection temperature at which a vicinity of the first temperature is an upper limit of a detection error; and
  a second value corresponding to the detection temperature at which a vicinity of the first temperature is a lower limit of the detection error, and
  the determining includes:
  determining that the temperature detection circuit is operating within the permissible range in a case where a detection result of the temperature detection circuit in a first state, in which the reference potential is switched to the first value, is non-detection of a temperature and a detection result of the temperature detection circuit in a second state, in which the reference potential is switched to the second value, is detection of a temperature;
  determining that the temperature detection circuit is operating outside the permissible range in a case where a detection result of the temperature detection circuit in the first state is the non-detection of a temperature and a detection result of the temperature detection circuit in the second state is the non-detection of a temperature; and
  determining that the temperature detection circuit is operating outside the permissible range in a case where a detection result of the temperature detection circuit in the first state is the detection of a temperature and a detection result of the temperature detection circuit in the second state is the detection of a temperature.

16. The test method according to claim 15, wherein the plurality of values further includes:
  a third value corresponding to the detection temperature at which a temperature lower than the first temperature is an upper limit of the detection error; and
  a fourth value corresponding to the detection temperature at which a temperature higher than the first temperature is a lower limit of the detection error, and
  the determining further includes:
  determining that the temperature detection circuit is operating outside the permissible range in a case where a detection result of the temperature detection circuit in a third state, in which the reference potential is switched to the third value, is the detection of a temperature; and
  determining that the temperature detection circuit is operating outside the permissible range in a case where a detection result of the temperature detection circuit in a fourth state, in which the reference potential is switched to the fourth value, is the non-detection of a temperature.

17. The test method according to claim 12, wherein the testing includes:
  making the temperature detection circuit detect whether or not a temperature reaches the detection temperature while serially switching a value of the reference potential to a value selected from two or more values, which are different from each other, with a temperature of the semiconductor device being kept at a third temperature corresponding to an ordinary temperature;
  determining a value of the reference potential corresponding to the third temperature according to a detection result of the temperature detection circuit at the third temperature; and
  determining the plurality of values to be used for a test of an operation of the temperature detection circuit according to the determined value of the reference potential.

18. The test method according to claim 13, wherein the semiconductor device further includes a nonvolatile semiconductor memory, and
  the testing includes:
  performing an ordinary temperature test of the nonvolatile semiconductor memory while keeping a temperature of the semiconductor device at a third temperature corresponding to an ordinary temperature;
  making the temperature detection circuit detect whether or not a temperature reaches the detection temperature while serially switching, in a state being kept at the third temperature, a value of the reference potential to a value selected from two or more values which are different from each other;
  determining a value of the reference potential corresponding to the third temperature according to a detection result of the temperature detection circuit at the third temperature; and
  determining the plurality of values to be used for a test of an operation of the temperature detection circuit according to the determined value of the reference potential.

* * * * *